United States Patent [19]

Lawrence et al.

[11] Patent Number: 5,029,461
[45] Date of Patent: Jul. 9, 1991

[54] HYDRAULIC FASTENER

[75] Inventors: Gordon D. Lawrence, Dundas; George G. Hall, Millgrove, both of Canada

[73] Assignee: N H C, Inc., Ontario, Canada

[21] Appl. No.: 598,779

[22] Filed: Oct. 18, 1990

Related U.S. Application Data

[63] Continuation of Ser. No. 236,161, Aug. 25, 1988, abandoned.

[30] Foreign Application Priority Data

Feb. 18, 1988 [CA] Canada ................................. 559281

[51] Int. Cl.$^5$ ............................................ B21B 31/08
[52] U.S. Cl. .................................... 72/238; 29/116.1; 384/556; 403/15; 72/237
[58] Field of Search .................... 72/237–239; 29/125, 123, 116.1, 252; 403/15, 37, 31; 411/432–434, 535, 536; 384/556

[56] References Cited

U.S. PATENT DOCUMENTS

| | | | |
|---|---|---|---|
| 1,959,901 | 5/1934 | Buehle | 29/252 |
| 3,033,597 | 5/1962 | Miller | 403/15 |
| 3,154,006 | 10/1964 | Novak | 411/434 |
| 3,558,199 | 1/1971 | Raiser | 384/556 |
| 3,588,044 | 6/1971 | Reichrath et al. | 72/237 |
| 3,712,092 | 1/1973 | Saxl | 72/237 |
| 3,772,759 | 11/1973 | Bunyan | 29/252 |
| 3,799,636 | 3/1974 | Kersting | 384/556 |
| 4,117,705 | 10/1978 | Dempsey | 72/237 |
| 4,581,911 | 4/1986 | Shinomoto | 72/237 |
| 4,747,291 | 5/1988 | Kostopolos | 72/238 |
| 4,748,729 | 6/1988 | Rochelmeyer | 72/238 |

FOREIGN PATENT DOCUMENTS

| | | | |
|---|---|---|---|
| 2229786 | 3/1974 | Fed. Rep. of Germany | 403/31 |
| 187103 | 11/1982 | Japan | 72/237 |
| 599956 | 3/1978 | U.S.S.R. | 29/252 |
| 1204925 | 9/1970 | United Kingdom | 411/432 |
| 1339838 | 12/1973 | United Kingdom | 403/15 |

OTHER PUBLICATIONS

Morgoil-Lager mit Wechselvorrichtung Advertisement Published by SMS Schlownamm-Siemag AG.
Literature Package Entitled "Type TQIT–Four-Row–For Mills Using Tight Fitting Cones" published by the Timken Co.
Drawing of Hydraulic Nut for Back-Up Roll, dated Mar. 1984.
Drawing of Morgan Construction Co. Entitled Morgoil Bearings 44-90, Mount-Bayonet Lock Design, dated Feb. 29, 1984.
The Mechanism of Sealing, George Angus & Co., Ltd., Fluid Seal Division.

*Primary Examiner*—Daniel C. Crane
*Attorney, Agent, or Firm*—Wegner, Cantor, Mueller & Player

[57] ABSTRACT

A hydraulic fastener for mounting bearing assemblies on the end of a roll in a rolling mill stand. The fastener includes a hydraulic ring cylinder component having a front face directed toward a roll and an inner cylindrical surface adapted to fit onto a reduced diameter end section of the roll. A chamber extends about the circumference of the cylinder component and is open at the front face. A hydraulic ring piston component is slidably received in this chamber and has an inner face. A retaining ring is threadedly mounted in the cylinder component to hold at least a substantial portion of the piston in the chamber. Passageways are provided in the cylinder component for injecting grease into the chamber and into a space formed between the inner face of the piston and an opposing face of the chamber. A split ring is secured on the end section of the roll to retain the cylinder component in place. Zero-leakage two-directional seals are arranged between the cylinder component and the piston at both radially inner and radially outer sides of the piston to prevent escape of said grease.

30 Claims, 10 Drawing Sheets

HYDRAULIC FASTENER

This application is a continuation of U.S. application Ser. No. 07/236,161, filed Aug. 25, 1988, now abandoned.

BACKGROUND OF THE INVENTION

This invention relates to forming rolls used in metal forming and in particular to the supporting mechanism for the bearing arrangement used to rotatably mount the large, heavy rolls, commonly called back-up and work rolls.

It is well known to mount a main roll of a rolling mill in top and bottom chalks in which are mounted suitable bearings. At the outboard and inboard end of the bearings are provided collars. In one known arrangement, the outboard collar has a bearing retainer extending around its circumference, which retainer is held in place by bolts threaded into the chalks. A thrust collar bears against the axial outer face of the outboard collar. Extending about the inboard collar is a seal ring that is mounted by bolts to the chalks.

It is also known to use plane bearings (usually babbit) to rotatably support the large rolls in a rolling mill. These bearings which use a large quantity of oil in order to operate can be used in conjunction with tapered roller bearings mounted axially outwardly from the plane bearing. The inner bearing support is held in place by the use of a split ring that is threaded on the outside and that is mounted in a circumferential recess formed in the roll end. The split ring is held in place by a complete exterior ring having internal threads and it is this exterior ring that actually bears against the side of the inner bearing support. The end of the roll and its exterior ring are covered by a protective cap. This arrangement for mounting bearings on the end of the rolls has several inherent disadvantages including the fact that the threads on the rings can be easily damaged and there is a possibility of injury to workmen because of the known method for tightening the threaded exterior ring (this method employs a pin and cable). The known methods for mounting the bearings is time consuming and it will be appreciated that it is important to reduce the downtime for these rolling mills as much as possible in view of the cost of such mills.

The use of a device known as "a hydraulic nut" is known in rolling mill construction, particularly in the construction of prestressed roll stands. The device can consist of ring-shaped members, namely a cylinder and a piston. In one known arrangement in a rolling mill, one of these members is directly connected with a tie rod by means of a clamp nut and is displaced with the expansion of the tie rod under hydraulic stressing, the other member resting against a support. For example a hydraulic stressing device as shown in U.S. Pat. No. 3,588,044 issued Jun. 28, 1971 to E. G. Reichrath and O. K. Buchheit. The device taught in this patent specification consists of a ring cylinder and a ring piston surrounding a tie rod. The piston is pressed downwardly by means of screw bolts and is connected directly through a divided ring with the end of the tie rod by engaging beneath a protruberance at the end of the tie rod. Fluid pressure is used to actually expand the tie rod in order to clamp the components together with a selected clamping force.

U.S. Pat. No. 4,581,911 issued Apr. 15, 1986 to Y. Shinomoto describes a cantilever-type rolling mill having a pair of roll shafts rotatably supported in a roll housing. The rolling mill includes a tension member provided axially through the center of the roll shaft and having the outer end thereof projecting out of the roll shaft. There is a roll compressing tool detachably engageable with the projecting end of the tension member, which tool incorporates a hydraulic piston-cylinder. The tool has a nut member threadably fitted on the outer periphery of the cylinder. An extraction ring interlocks the roll unit with the tool. An oil pressure passage in the cylinder communicates with an annular groove located at the inner end of the piston. In order to mount the roll unit, this unit is mounted on the tool by the use of the extraction ring and then the unit and the tool are fitted onto the roll shaft using a jig. Clearly this known hydraulic piston-cylinder mechanism is not used to hold any bearing arrangement for the end of the roll in place.

The hydraulic piston-cylinder mechanism or nut is single acting, that is, it cannot be pressurized hydraulically in more than one direction. It is pressurized during the mounting or assembly operation only and after this operation is completed, the pressure in this hydraulic nut is removed.

Although it is believed by the applicants that the use of hydraulic nuts to mount the bearing arrangement for a roll in a rolling mill has been proposed in the past, such proposals have not met with widespread commercial success. Some of these proposals have been in practice unworkable and because of the high cost of rolling mills in general, this industry has been reluctant to accept and adopt new construction techniques for these mills, at least until a new construction has proven itself as being a definite improvement.

A drawing produced by the Timken Company shows a hydraulic nut arrangement for holding in place a tapered four roll T.O.O. roller bearing mounted on the reduced end of a work roll. The hydraulic nut is formed by two ring-shaped inner and outer sections. The outer ring section has a L-shaped cross-section and it is this section that bears against a further ring member whose inner end bears against the inner bearing support. Two ring-shaped seals appear to be provided between the contacting surfaces of the inner and outer ring sections that form the hydraulic nut. Another ring member is mounted on the outer end of the roll to bear against the outer end of the inner ring section and hold the section against axially outward movement.

It is an object of the present invention to provide a hydraulic fastener for mounting one end of a roll in a rolling mill stand, said fastener being reliable and relatively easy to construct and to use.

It is a further object of the invention to provide a hydraulic fastener which can be used not only to mount one end of a roll in a rolling mill stand but which is kept under pressure during operation of the rolling mill.

SUMMARY OF THE INVENTION

According to the one aspect of present invention, there is provided a rolling mill stand having a roll, a bearing member for rotatably mounting one end of the roll, and a hydraulic fastener for holding a bearing member in place including a hydraulic ring cylinder component having a one face extending inwardly perpendicular to the roll axis and an inner cylindrical surface adapted to fit onto a reduced diameter end section of the roll. A chamber extends about the circumference of this cylinder component and is open at the one face.

A hydraulic ring piston component is slidably received in this chamber and has an inner face. Means are provided to retain at least a substantial portion of the piston in the chamber. There are also passageway means in the cylinder component for injecting a hydraulic material into the chamber and into a space formed between the inner face of the piston and an opposing face of the chamber. In addition there are means for retaining the combination of the cylinder component and the piston component on the end section of the roll and zero-leakage, two directional seals arranged between the cylinder component and the piston at both radially inner and radially outer sides of the piston. Each seal is capable of withstanding pressure of at least 2000 psi. During normal use of the rolling mill, the hydraulic fastener is maintained under hydraulic pressure to hold the bearing member in place.

In a preferred embodiment, each of these seals comprises a filled Teflon seal capable of sealing off hydraulic material under pressure of at least 10,000 psi. Also, the preferred seals are two directional, that is, capable of sealing in either of two directions, for reasons which will be clear from the following description.

If desired, there can be provided a mechanical locking device capable of holding the end of the roll in place in event of failure of the hydraulic cylinder and piston components. This locking device includes a locking ring threadably mounted on the exterior of the ring cylinder.

Further features and advantages will be become apparent from the following detailed description of a preferred embodiment taken in conjunction with the accompanying drawings.

DETAILED DESCRIPTION OF PREFERRED EMBODIMENTS

Figure 1:
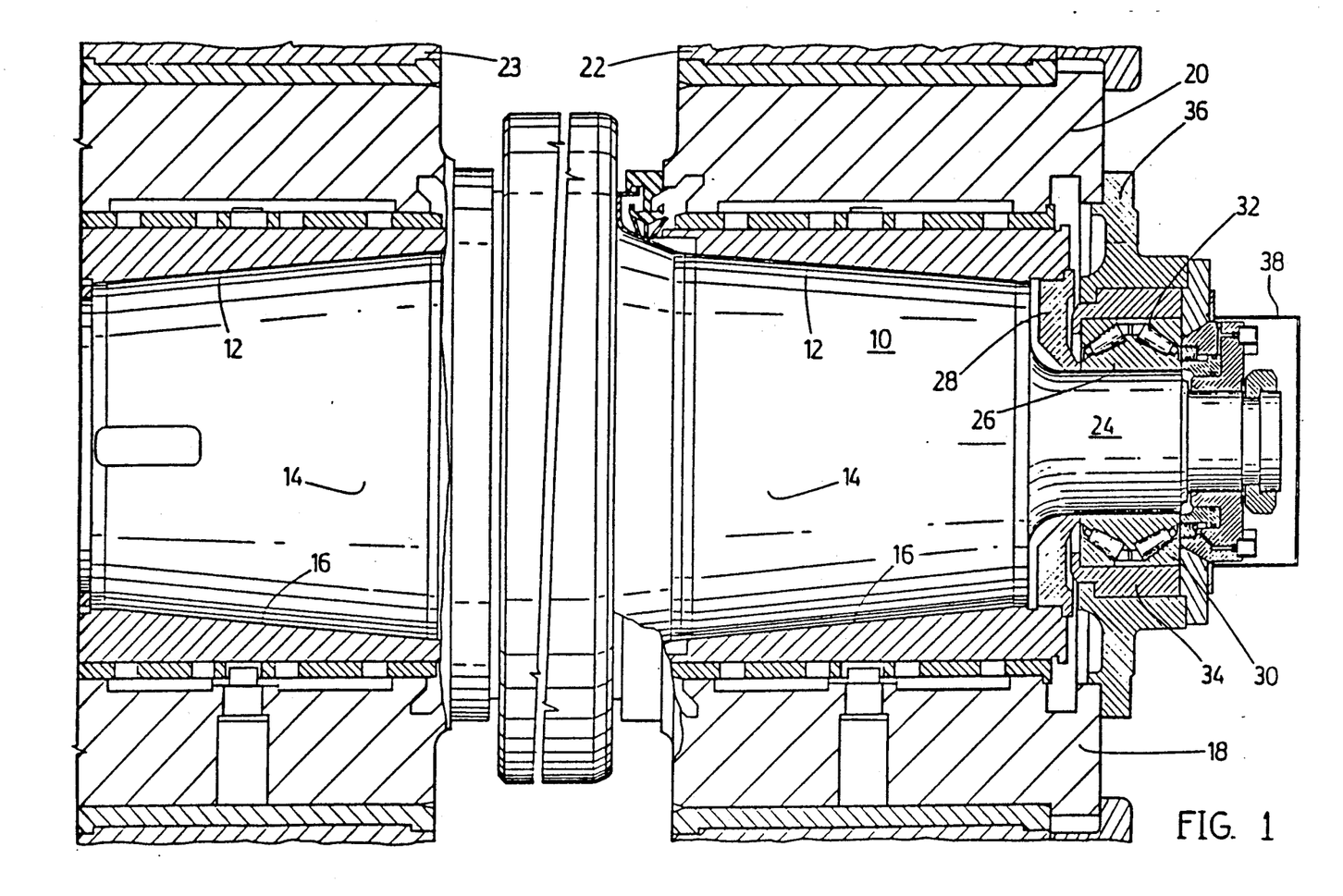
FIG. 1 is a horizontal cross-section of a back-up roll in a rolling mill, which roll is provided with plane bearings.

Except for the hydraulic fastener of the present invention used therein, the mounting arrangement for a backup roll 10 shown in FIG. 1 is of standard configuration. The particular backup roll shown employs two plane bearings 12. For purposes of these bearings the roll 10 has a tapered end section 14 located at each end of the roll. Each end section 14 fits into a tapered bearing sleeve 16. Each of these plane bearing sleeves is mounted in a bottom chock 18 and a top chock 20. These chocks are mounted in roll housing 22 for the operating side of the roll and roll housing 23 for the drive side of the roll.

Extending axially outward from each end section 14 is a generally cylindrical, reduced diameter end section 24 and fixedly mounted on the end section 24 is an inner bearing support 26. It will be understood that the support 26 rotates with the roll 10. The inner end of the support 26 rests against a ring collar 28. There is also an outer bearing support 30 and between the supports 26 and 30 are tapered roller bearings 32. The outer bearing support 30 is mounted in support ring 34 to which is attached a circular end plate 36 having an opening through which extends the reduced diameter end of the roll 10. Attached to the plate 36 is an end cover 38 which protects the end of the roll and the hydraulic fastener arranged thereon. The end cover 38 is detachably connected by means of bolts 40.

Figure 11:
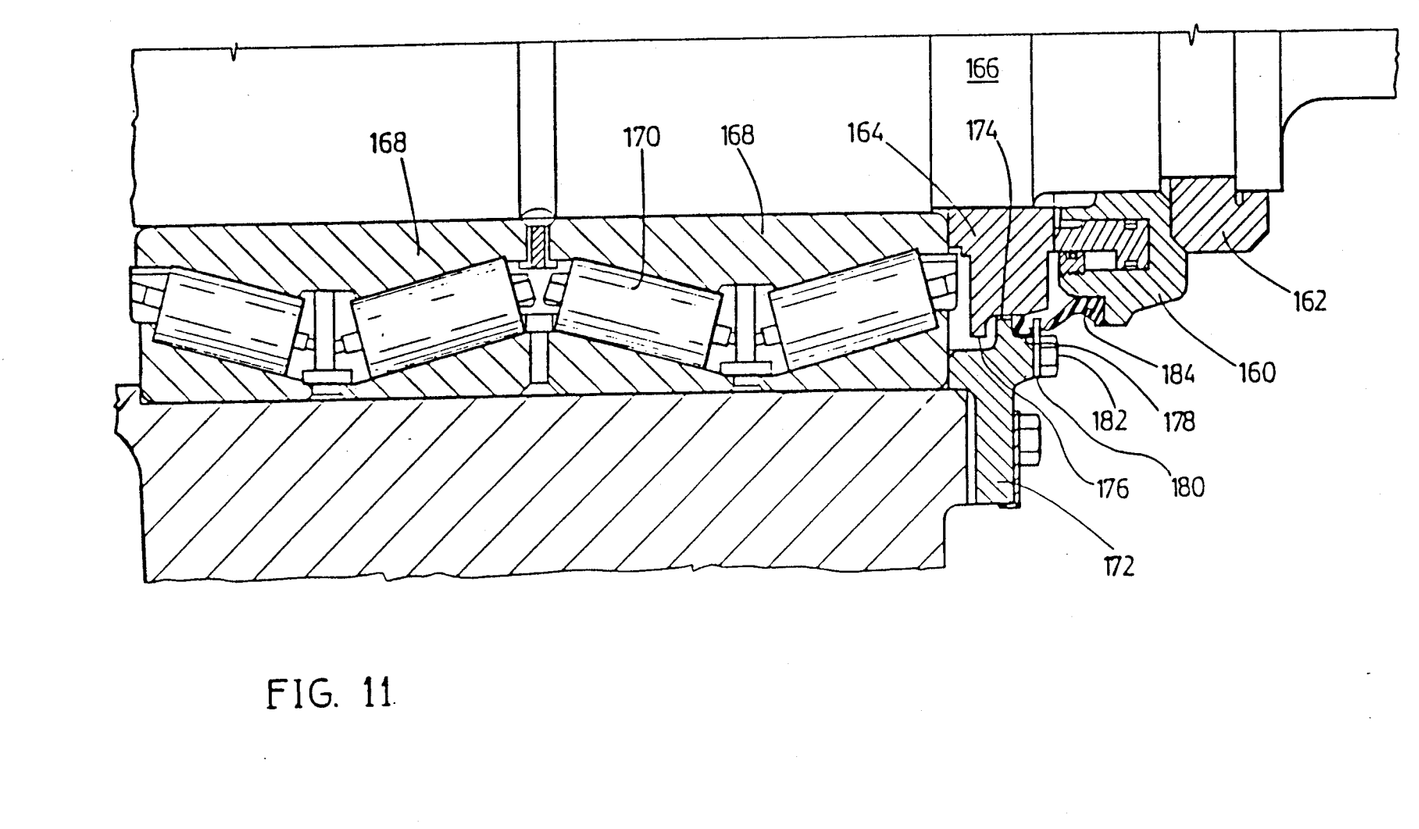
FIG. 11 is an axial cross-sectional view similar to FIG. 2 but illustrating an alternate version of the invention used in conjunction with four rows of roller bearings.

Although the present invention as illustrated in FIG. 1 is employed in conjunction with a backup roll supported by plane bearings, it will be appreciated that the present invention can also be used in conjunction with rolls supported by roller bearings only. For example it is known to mount each reduced end of a roll with 4 rows of roller bearings and the hydraulic fastener of the present invention can be used to support the inner bearing support for these rows of bearings. Such an arrangement is shown in FIG. 11 referred to hereinafter. The hydraulic fastener of the present invention can be used in the mounting of work rolls as well as backup rolls. Also although FIG. 1 only illustrates the present hydraulic fastener on the operator side of the roll, it is also used on the drive side of the roll.

Reference will now be made to the construction of the roll neck on which the hydraulic fastener 42 of the invention is mounted. The reduced diameter end section 24 includes an end portion 44 that is further reduced in diameter. Extending around the end portion 44 is a circumferential recess 46 which separates a head portion located at the very end of the roll from the remainder of the end portion 44. The illustrated head portion 48 has the same diameter as the remainder of end portion 44. In the illustrated roll, a rounded shoulder 50 is formed where the end section 24 meets the end portion 44, in order to prevent stress failure or stress cracking where the diameter of the roll is reduced.

Figure 2:
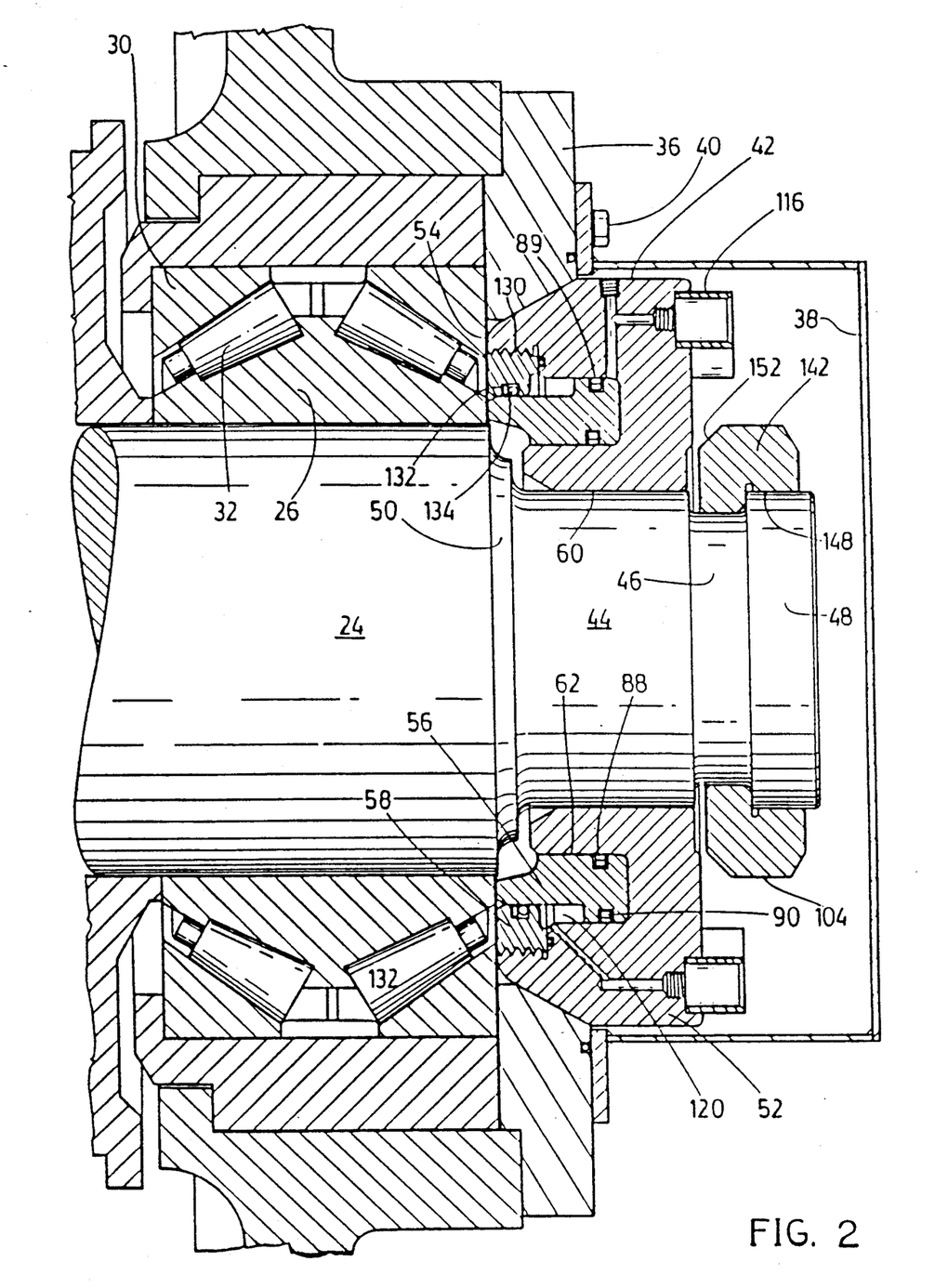
FIG. 2 is a detailed view, again in cross section, of the mounting arrangement at one end of the back up roll as shown in FIG. 1, which view shows a hydraulic fastener constructed in accordance with the invention.

The principle components of the hydraulic fastener 42 are shown in FIG. 2 in an assembled condition and these components include a hydraulic ring cylinder component 52 having a front face 54 directed towards the roll, a hydraulic ring piston component 56, and a retainer ring 58 for retaining at least a substantial portion of the piston 56 in the cylinder component 56. The component 52 has an inner cylindrical surface 60 adapted to fit onto the reduced diameter end section or end portion 44 of the roll. A chamber 62 extends about the circumference of the cylinder component 52 and is open at the front face 54.

Figure 3:
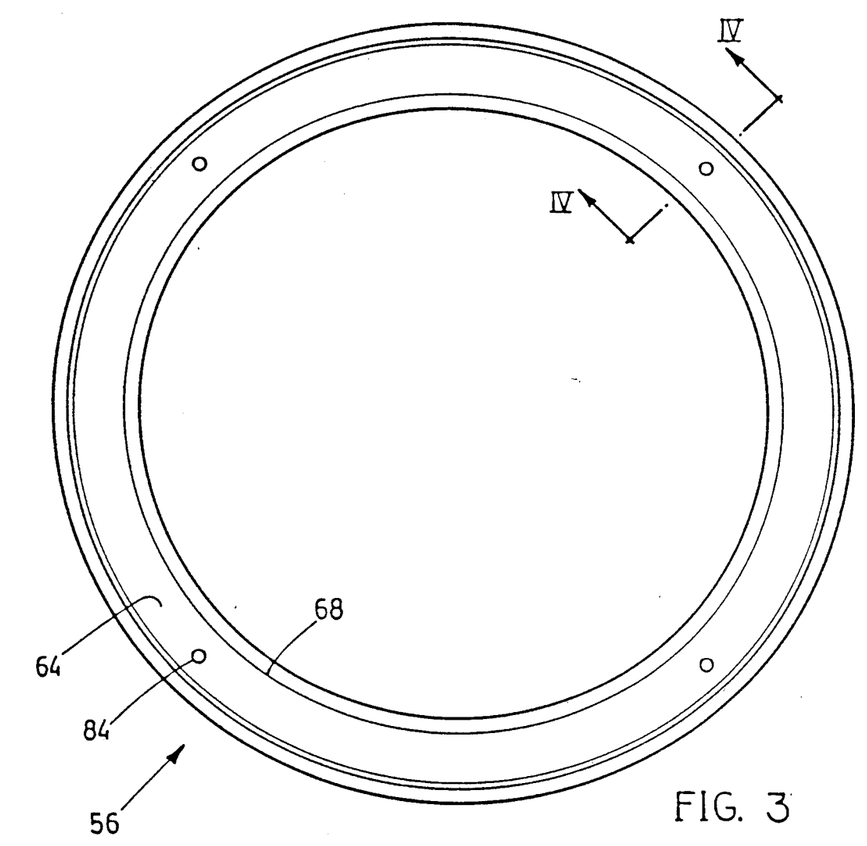
FIG. 3 is an end view of the piston used in the hydraulic fastener of FIG. 2, which view shows the end facing towards the inner bearing support.
Figure 4:
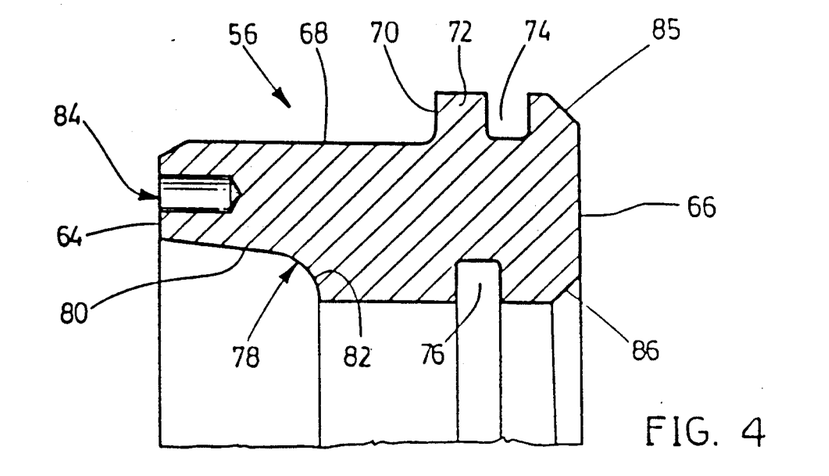
FIG. 4 is a cross-sectional view of the piston taken along the line IV—IV of FIG. 3.

The preferred piston component 56 will now be described in detail with reference to FIGS. 3 and 4. The piston has a relatively narrow outer face 64 and a wider inner face 66. The piston has a cylindrical surface 68 extending about its interior and extending from a point near the outer face 64 to a point past the transverse center of the piston. A shoulder 70 extends radially inwardly from the surface 68 to form a wide end section 72 of the piston. Located in the radially inner side of the piston component 56 is a recess 74 of generally rectangular cross section. A similar recess 76 is located in a radially outer side of the piston. Also in the radially outer side of the piston is a further recess 78 that extends to the outer face 64. The recess 78 includes a conical surface 80 that tapers slightly outwardly in the direction of the inner face 66 and a rounded surface 82 that extends to the radially outer side of the piston.

Located in the outer face 64 of the piston are four small holes 84 that are drilled and tapped. The holes 84 are used to lift the piston component 56 and mount it in the cylinder component 52. Similar holes (not shown) are also preferably provided on the axial outside surface of the cylinder component for the same reason.

A preferred type of steel for both the piston 56 and the cylinder in which it is mounted is heat treated 4340 steel. Another type of suitable steel is 52100 heat treated steel. Depending upon the application other types of material may also be used (such as high strength aluminum). Preferably the inner corners of the piston at 85 and 86 are mitred at a 45° angle as shown in FIG. 4.

Mounted in each of recesses 74 and 76 are zero-leakage, two-directional seals 88 and 89 which effectively seal any space between the cylinder component and the piston. Preferably each of these seals comprises a filled Teflon TM seal capable of sealing off the hydraulic material, i.e. grease, used to operate the hydraulic fastener. A typical minimum pressure for this grease is 2,000 psi. A particularly preferred form of Teflon seal is bronze-filled. Each of the preferred seals 88 and 89 includes a suitable energizer indicated at 90 in FIG. 2 which supports the filled Teflon seal and is located in back thereof. A preferred energizer is made from Buna-N rubber. Another suitable material is VITON (trademark) which has the advantage of being impervious to acids and water. The preferred bronze-filled Teflon seal mentioned above is available from Double Seal Company of Fortworth, Tex. The material used in the seal is Model No. MNM14 or MNM118. Such seals are also available from Kaydon of Baltimore, Md. under Model No. K30T.

Figure 6:
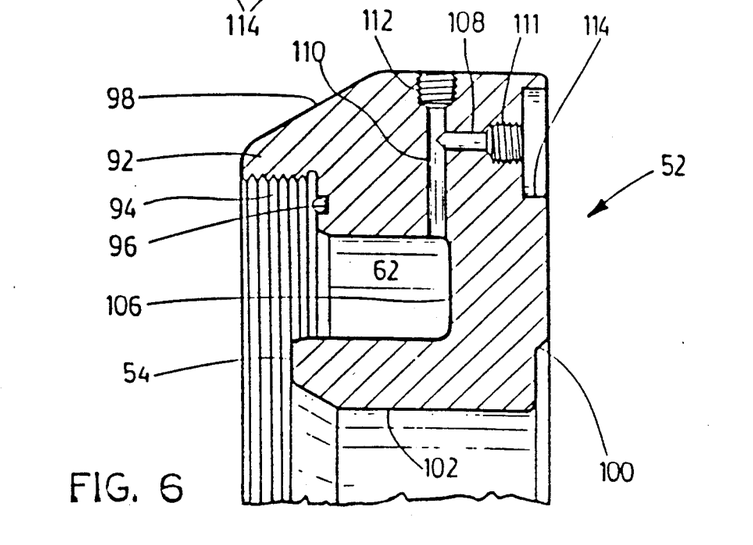
FIG. 6 is a cross-sectional view of the cylinder component, which view is taken along the line VI—VI of FIG. 5.
Figure 7:
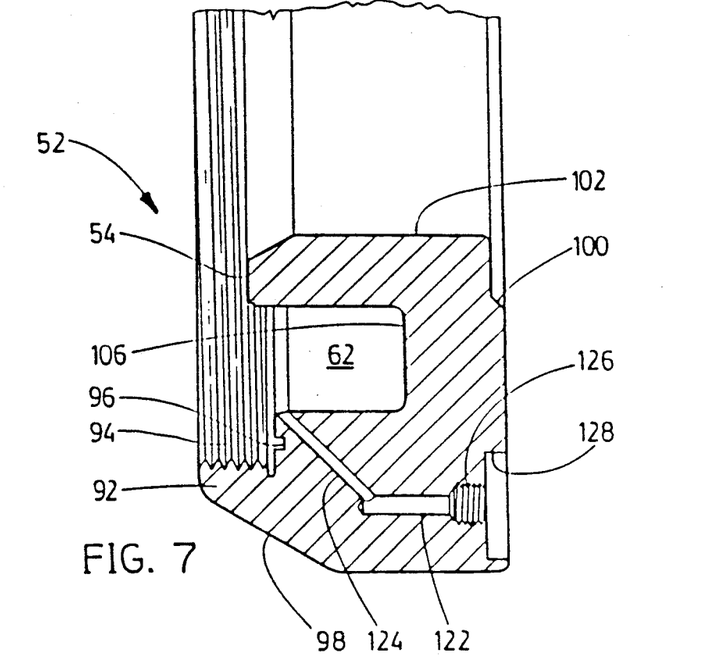
FIG. 7 is another cross-sectional view of the cylinder component taken along the line VII—VII of FIG. 5.

The construction of the cylinder component 52 will now be described with reference to FIGS. 5 to 7. As indicated above, the component 52 has the chamber 62 extending about its circumference and open at the front face 54. The chamber 62 is sized to snuggly accommodate the above described piston component 56. The depth of the chamber 62 is less than the depth of the piston component as can be seen from FIG. 2. However the depth of the cylinder component is greater at the radially outer side thereof, there being a projecting lip 92 that is threaded on the radially inner side thereof. The lip 92 thus forms a circular opening or recess 94 for receiving the aforementioned retaining ring 58 described further hereinafter. A small recess 96 is formed in the shoulder that extends between the edge of the chamber 62 and the lip 92 and this recess accommodates a static seal such as a Buna N O-ring.

The lip 92 and the radially outer side of the cylinder form a sloping surface 98 which extends along a correspondingly sloping surface formed on the in plate 36 (see FIG. 2). Another shorter sloping surface 100 is formed on the rear face of the cylinder a short distance from the inner cylindrical surface 102. The sloping surface 100 provides a means for securing a split ring 104 in place as explained hereinafter.

Passageway means are provided in the cylinder component 52 for injecting a hydraulic material, such as grease, into the chamber 62 and into a space formed between the inner face of the piston and the opposing face 106 of the chamber 62. A preferred form of passageway is shown in detail in FIG. 6. In particular a passageway 108 extends from the rear face of a cylinder to a radially extending passageway 110. At its inner end, the passageway 110 opens into the chamber 62 immediately adjacent to the bottom 106 thereof. The radially outer end of passageway 110 opens into the radially outer surface of the cylinder. Both outer ends of passageways 108 and 110 are widened and threaded at 111 and 112 to permit the attachment of hydraulic fittings. In particular a charging fitting is attached at 111 and a pressure relief fitting is attached at 112. Also formed about the outer end of a passageway 108 is a wide circular recess 114 into which is fitted a cylindrical guard 116 for the fitting. These guards are shown in FIG. 2 of the drawings. It will be understood that in order to push the piston component out of the cylinder component 52, it is simply necessary to force grease through the passageway 108 and the passageway 110 into the chamber 62. Grease is prevented from passing out of the opening at 112 by the fitting inserted into the opening 112 except when the pressure exceeds a predetermined limit. A suitable grease for this purpose is general purpose mill grease. Pressures in this hydraulic nut during use thereof can be in excess of 10,000 psi.

Figure 5:
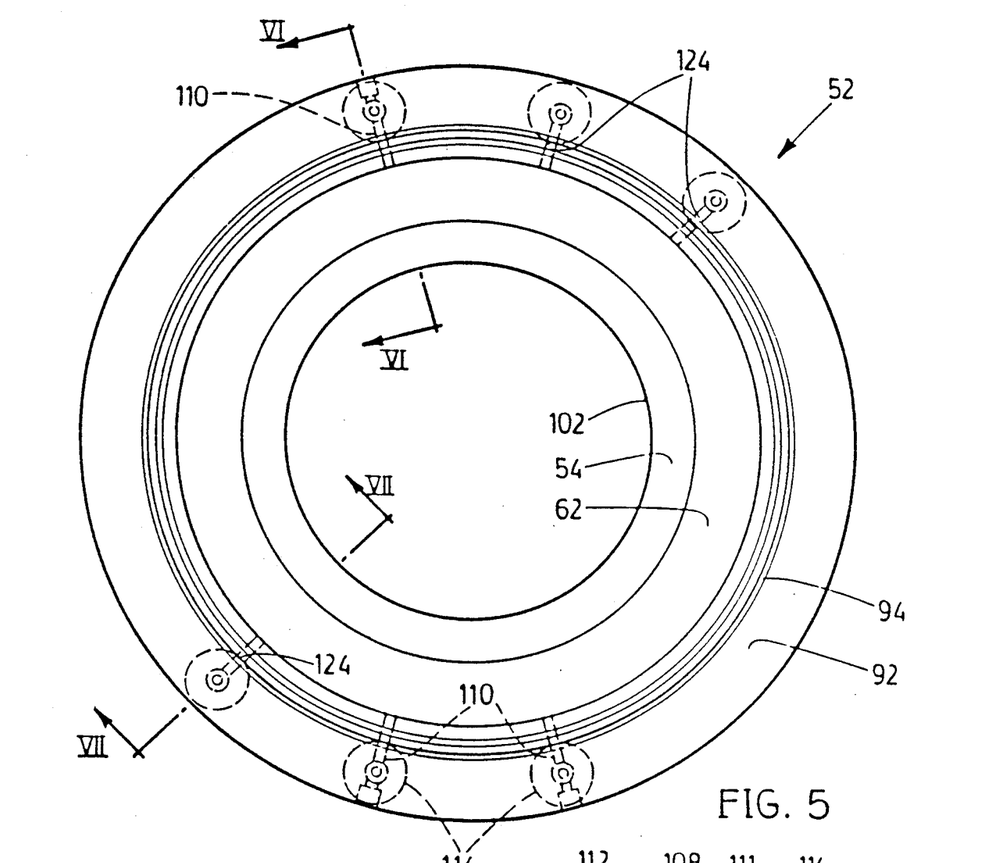
FIG. 5 is an end view of the cylinder component used in the hydraulic fastener of FIG. 2, which view shows the front face directed towards the roll.

As indicated in FIG. 5 there are three of the passageways 110 for injecting grease into the cylinder together with the accompanying fittings. Two of these are located adjacent one another on one side of the cylinder component and the third is located diametrically opposite one of the other two passageways.

Preferably there are also provided passageway means in the cylinder component for injecting a hydraulic material such as grease into the chamber 62 and into another space 120, one side of which is defined by part of an outer face of the piston component 56. Injection of hydraulic material through this passageway acts to push the piston component further into the chamber. This step is used when it is desired to remove the roller bearings for the roll. This further passageway is shown in FIG. 7 and it includes a section 122 that is parallel to the cylindrical surface 102 and a sloping section 124 that extends from the innermost end of the passageway 122 to a corner of the chamber 62. The outer end of passageway 122 is widened and threaded to accommodate a grease fitting at 126. The fitting itself is a standard charging fitting for grease and therefore has not been illustrated in the drawings. Again the outer end of the passageway 122 is provided with a relatively wide circular recess 128 into which is fitted a cylindrical guard for the fitting. Again there are three of the passageways 122 and 124 provided as indicated in FIG. 5 of the drawings.

Figure 8:
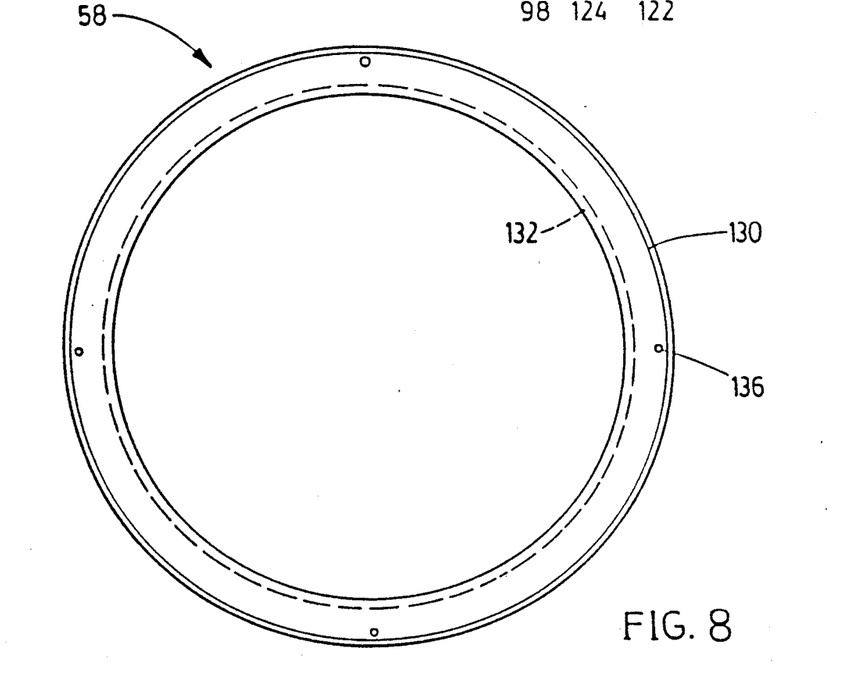
FIG. 8 is an outer end view of a retaining ring used in the hydraulic fastener of FIG. 2.

FIG. 8 illustrates the retaining ring 58 which is used to retain at least a substantial portion of the piston 56 in the chamber 62. This ring can be made from AISI 4340 steel which has been quenched and tempered and stress relieved. The ring has threads 130 extending about its circumference in order that it can be threaded into the aforementioned opening in the front face of the cylinder. These threads should be strong enough to be able to withstand a maximum outward hydraulic force on the piston component. A suitable thread for this purpose is 60° truncated V-thread. Preferably the retaining ring is locked in place and this can be done by a locking screw (not shown) that extends through a hole in the cylinder component 52. Extending about the circumference of the retaining ring and located centrally on the interior surface is a recess 132 of generally rectangular cross section. Positioned in this recess is a suitable seal 134 to prevent the hydraulic material from passing between the retainer ring and the adjacent side of the piston component 56. Preferably this seal is Buna-N O-ring seal provided with a back-up ring seal.

Instead of using the illustrated seal 134, the seal could be a Teflon TM -filled seal constructed in the same manner as the seal 89 described above. This more expensive type of seal would be used when the hydraulic fastener is adapted to retract or remove the roller bearings and their support housing. This more expensive seal would not be required when the hydraulic fastener is not provided with the retraction capability (an optional feature).

The preferred retaining ring 58 has four holes drilled into the center of its outside surface. These holes 136 are evenly distributed about the circumference of the ring and are used to thread the retaining ring into the cylinder component with a suitable, known tool. In one embodiment these holes are ½ inch deep and have a diameter of 3/16 inch.

Figures 9, 10:
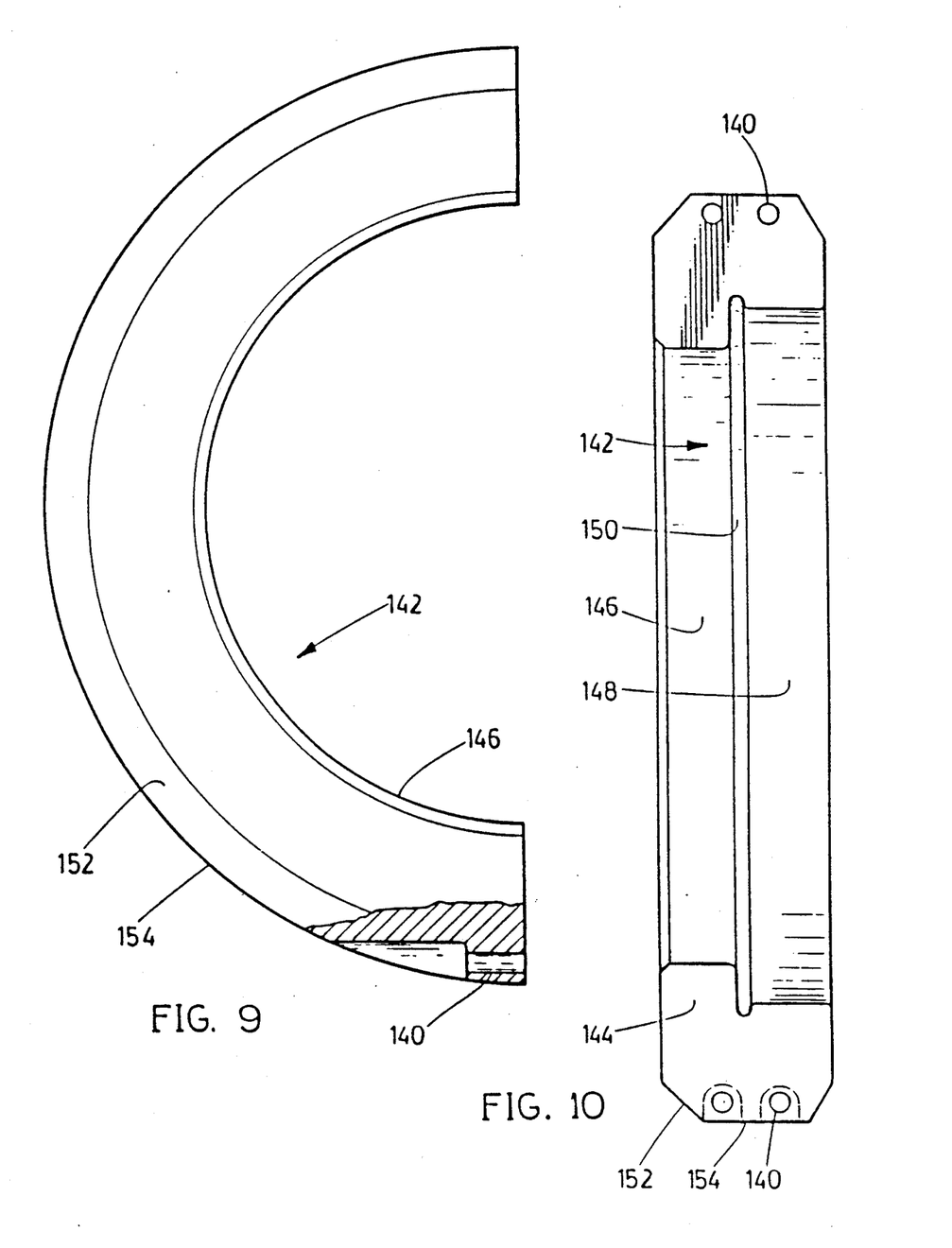
FIG. 9 is an inner end view of one half of the split ring used to mount the hydraulic fastener of FIG. 2.
FIG. 10 is a right side view of the split ring component shown in FIG. 9.

A preferred form of split ring used to secure the hydraulic fastener on the reduced end of the roll is shown in FIGS. 9 and 10. Only the lefthand side of the split ring is illustrated in these figures but it will be appreciated that the righthand side of the split ring is a mirror image of the illustrated half. The two halves are bolted together by means of standard bolts that are not shown in the drawings. The two bolts on each side extend through bolt holes 140. The illustrated split ring half 142 is attached to the roll neck in the manner shown in FIG. 2 after the hydraulic fastener has been put in place. The half 142 is generally L-shaped in cross section with an inward extension 144 defining a cylindrical surface 146, the radius of which is substantially the same as the radius of the recess 46 forming the roll neck. Another interior cylindrical surface 148 has a radius that is substantially similar to the radius of the head portion 48 of the roll neck. These two cylindrical surfaces 146 and 148 are separated by a small circumferential groove 150.

A sloping surface 152 extends between the axially inside face of the split ring and the radially outer face 154. This sloping surface 152 serves an important function in that, in cooperation with the hydraulic nut, it helps to secure the split rings firmly onto the roll neck. The sloping surface 152 is located opposite the aforementioned sloping surface 100 located on the rear face of the cylinder component. It will be understood that extension of the piston component from the cylinder component will cause interengagement of the sloping surfaces, thereby providing a further mechanism for holding the split ring on the roll neck.

FIG. 11 illustrates an alternate construction for the hydraulic fastener of the invention. Except as described hereinafter, the construction of this alternative is substantially similar to that described above. The hydraulic fastener or hydraulic nut is held in position on the reduced end of the roll by a split ring 162 similar to that shown in FIGS. 9 and 10. However instead of bearing directly against the inner bearing support, the piston of the hydraulic fastener bears against a solid steel ring 164 that extends about the reduced end portion 166 of the roll. The inner face of the ring 164 axially supports and positions the inner bearing support 168 which rotates with the roll. It will be particularly noted that in this embodiment there are two bearing supports 168 required to support four rows of bearings 170. This configuration is an example of a bearing arrangement that can be used in place of the plane bearing arrangement shown in FIG. 1.

The embodiment of FIG. 11 is equipped with a mechanical locking device 172 capable of holding the roller bearings in place (and therefore the end of the roll in place) in event of failure of the hydraulic fastener 160. The ring 172 has an inwardly extending flange 174 having an inner diameter which is less than the outer diameter of an outwardly extending flange 176 formed on the ring 164. After the bearings have been secured in place using the hydraulic fastener, the flange 174 is brought into close engagement with the flange 176. It will be readily seen that in the event that the hydraulic fastener should fail, outward movement of the ring 164 is still prevented by the ring 172 and its flange 174. Leakage of lubricant from the bearings 170 is prevented by a suitable seal 178 which is secured in place by a further ring 180 detachably connected to the ring 172 by bolts 182. The space between the hydraulic nut 160 and the ring 164 is protected by a lip seal 184 of known construction. This circumferential extending seal is firmly mounted on the outside of the cylinder of the hydraulic fastener 160.

Figure 12:
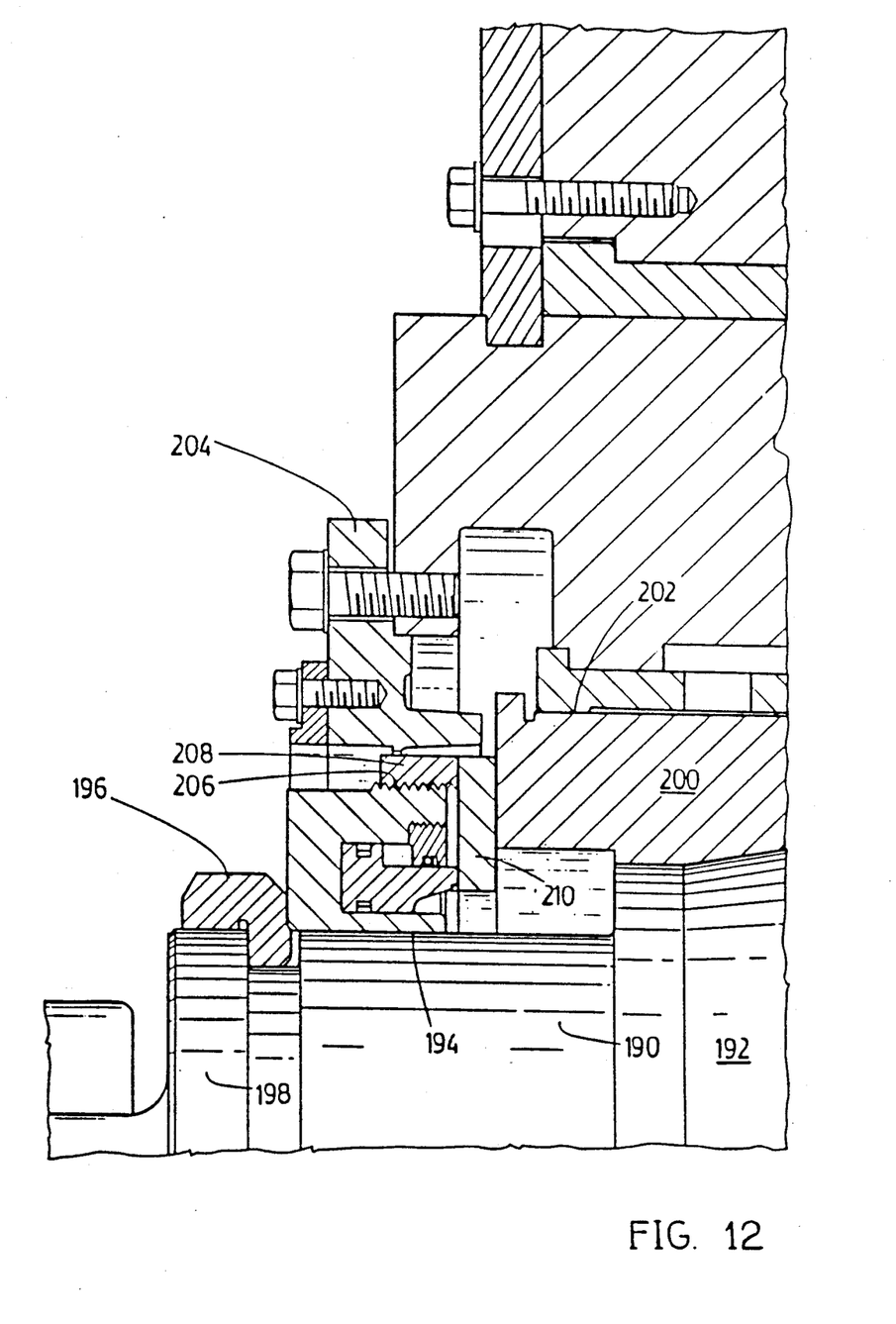
FIG. 12 is an axial cross-sectional view of another embodiment shown in a back-up roll application, which embodiment employs a mechanical locking device in addition to the hydraulic nut.

FIG. 12 illustrates another embodiment of the hydraulic fastener of the present invention, which fastener is provided with a mechanical locking device. The reduced end 190 of a back-up roll 192, only a portion of which is shown, has mounted thereon a hydraulic fastener 194. This hydraulic fastener is constructed in a similar fashion to the hydraulic fastener already described and illustrated in FIG. 2 of the drawings. The hydraulic fastener is held in place by a split ring 196 which is connected to the roll neck 198. Also shown in FIG. 12 is the inside section 200 of a plane bearing, which section rotates with the roll 192. It will be understood that this inside section has a polished surface at 202. A portion of a retaining collar 204 of known construction is also shown in FIG. 12.

Unlike the hydraulic nut of FIG. 2, the hydraulic nut 194 is threaded on its outer surface at 206. There is provided on this outer surface a mechanical locking ring 208 that is internally threaded. Also provided in this version of the invention is a further mechanical locking ring 210. It is arranged between the hydraulic nut 194 and the plane bearing 200. In the installation of the bearing 200, the locking ring 210 is placed in the position shown in FIG. 12 and then the hydraulic nut 194 is expanded (by injection of grease) so that it bears firmly against the ring 210. After this operation has been carried out, the locking ring 208 can then be threaded further towards the right in FIG. 12 so that it also bears firmly against the locking ring 210 as shown. It will thus be seen that in the event of failure of the hydraulic nut 194, the locking ring 210 and the plane bearing 200 will still be held firmly in place by the mechanical locking ring 208.

Figure 13:
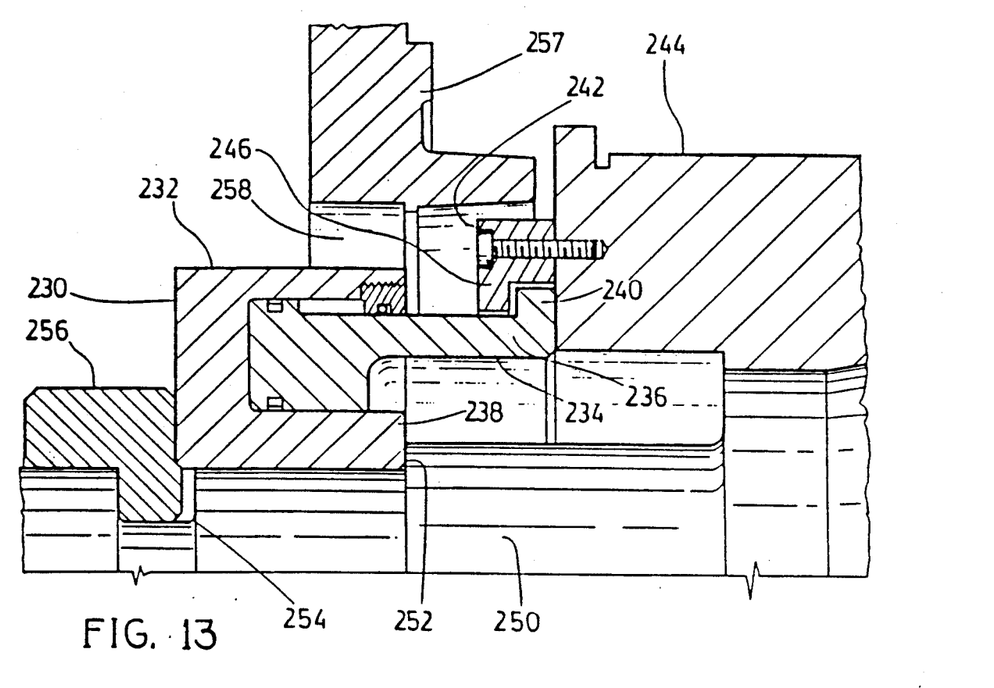
FIG. 13 is an axial cross-section of another embodiment of the hydraulic nut, which nut is capable of removing the bearing for the roll.

In the embodiment of FIG. 13 there is a hydraulic nut 230, only portions of which are shown for ease of illustration. This hydraulic nut includes a ring cylinder component 232 and a ring piston component 234. In this version the piston component has an axial extension 236 which projects a substantial distance inwardly from the inner face 238 of the cylinder component. The extension 236 has a radially outwardly extending flange 240 which forms means for pulling an adjacent bearing member. This flange fits under a ring member 242 that is bolted to the inside section 244 of a plane bearing, which section rotates with the roll. The ring member 242 has a radially inwardly extending flange 246 whose interior diameter is less than the exterior diameter of the flange 240. It will be readily seen that retraction of the piston component 234 into the cylinder component will also cause retraction of the inside section 244 of the bearing. In this way the hydraulic nut 230 serves the dual function of not only holding the bearing component in place but also helping to remove the bearing component when this is required.

The construction of the end of the roll in the embodiment of FIG. 13 should also be noted. The reduced diameter end section 250 is provided with a shoulder at 252 against which part of the inner surface 238 of the cylinder component rests. Thus axially inward movement of the cylinder component beyond the shoulder 252 is prevented.

As in the above described version of the roll, there is a circumferential recess 254 near the outer end of the roll. A suitable split ring 256 which holds the hydraulic nut 230 in place extends into the recess 254.

There is also shown in FIG. 13 part of a retaining collar 257 of known construction. A seal (not shown) is arranged between the hydraulic nut 230 and the retaining collar 257 in the gap 258.

Figure 14:
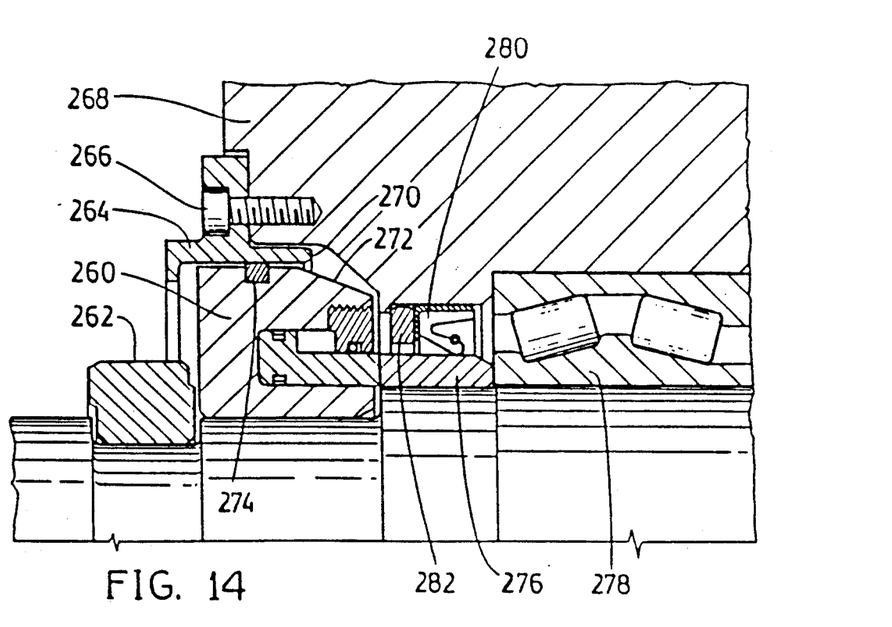
FIG. 14 is an axial cross-section of another embodiment of the hydraulic nut provided with a rotating seal and retaining ring located at the radially outer surface of the nut.

FIG. 14 is a cross-sectional detail showing another version of the hydraulic nut of the invention being used to retain the bearings of a working roll. For ease of illustration, the hydraulic nut 260 has only been shown in outline in FIG. 14 but it will be appreciated that the nut 260 is similar in its construction to the hydraulic nut of FIG. 2 except as explained hereinafter. The nut 260 is held in place by a suitable split ring 262 that is mounted in a circumferential recess formed in the roll. Extending about the radially outer surface of the hydraulic nut is a hydraulic nut retaining ring 264 which is attached by bolts 266 to the side of the chock 268. The retaining ring 264 has an axially extending flange 270 that extends inwardly between hydraulic nut. In order to seal the gap between the hydraulic nut and the retaining ring 264 there is a rotating seal 274 which could be a lip seal or a filled Teflon TM seal. The particular form of this seal would depend upon the particular application.

In this embodiment the piston component of the hydraulic nut bears against a wear ring and spacer 276 which in turn bears against the inner roller bearing support 278. Extending about the circumference of the spacer 276 is a spring loaded garter seal 280 of known construction. Located axially outwardly from the seal 280 is a back-up ring 282 that is also a known component of a working roll bearing arrangement.

It will be seen that the configuration of FIG. 14 provides an effective seal between the chock 268 and the hydraulic nut 260 located therein. This prevents any dirt or other foreign matter from entering into the gap between the chock and the hydraulic nut where it might cause damage or unnecessary wear.

Figure 15:
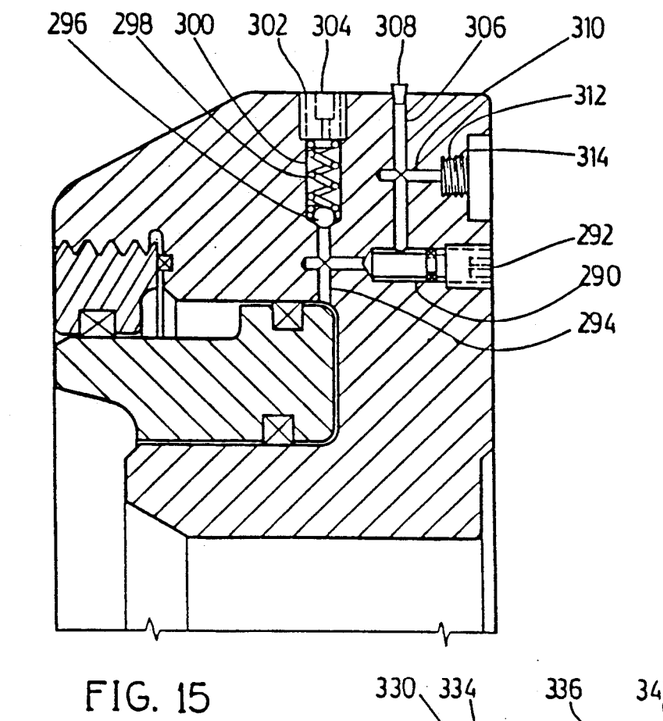
FIG. 15 is a cross-sectional detail of a hydraulic nut illustrating the hydraulics provided to expand the nut.
Figure 16:
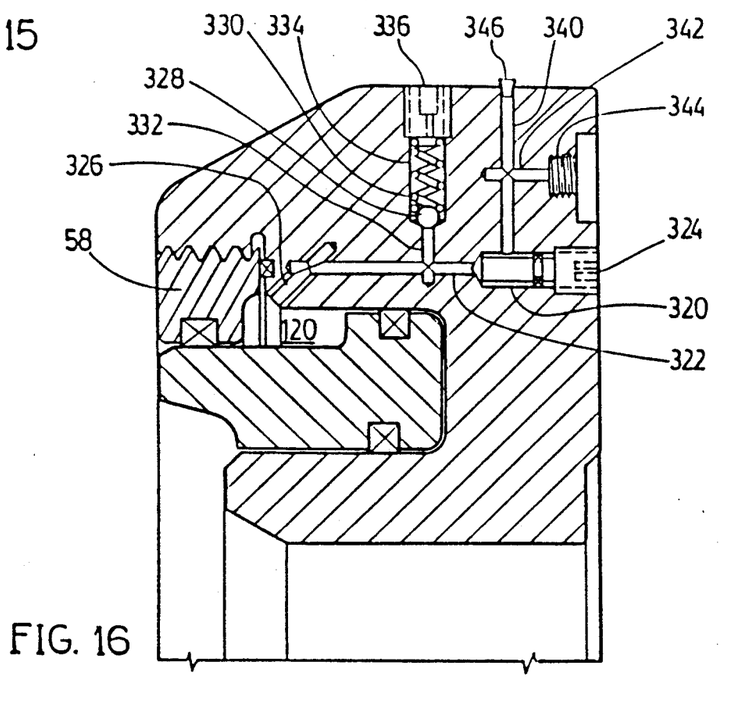
FIG. 16 is another cross-sectional detail of the hydraulic nut of FIG. 15 but showing the hydraulics provided to retract the nut.

Turning now to FIGS. 15 and 16 of the drawings, these drawings illustrate an alternative hydraulic arrangement for a hydraulic nut constructed in accordance with the invention. In particular, FIG. 15 illustrates the passageways provided for charging and discharging the hydraulic material in order to expand the hydraulic nut. In particular, there is provided an axially extending charging passageway 290 which is provided with a threaded seat 292 to which a hydraulic line can be attached. The passage 290 has a reduced diameter end section that intersects a radially extending passageway 294. The radially outer end of the passageway 294 is sealed by a steel ball 296 which together with a spring 298 forms a high pressure relief valve. The spring 298 is seated in a passageway 300 of increased diameter. The spring is held in the passageway by an end plug 302 that is threaded into the cylinder component of the nut. This plug has a central passageway or vent hole at 304.

Intersecting the passageway 290 at right angles is a smaller, radially extending passageway 306 which is sealed at its outer end by a pipe plug 308. Intersecting the passageway 306 at right angles is a short passageway 310 which opens into a seat 312 of greater diameter. At the outer end of the seat 312 is a circular recess 314 into which is fitted a protective shield (not shown) for the hydraulic connection. It will be understood that the hydraulic material is fed through the passageway 290 and the smaller passageway 294 in order to expand the nut. The hydraulic material can be discharged or removed through the passageway 306 and the connecting passage 310.

FIG. 16 illustrate an alternate arrangement for the hydraulics to retract the hydraulic nut. In this embodiment there is a main axially extending passageway 320 which has an inner portion 322 of reduced cross-section. At the outer end of the passageway 320 is a threaded seat 324 and Allen key slot. The portion 322 is intersected at an oblique angle by a short passageway 326 which opens into the space 120 defined in part by the piston component and the retaining ring 58. It will be understood that in order to retract the nut, the user pumps the hydraulic material through a suitable hydraulic hose (not shown) that is connected up to the outer end of the passageway 320. The hydraulic material flows through the passageway 320 and through the passageway 326 into the space 120. Excessive pressure build up is prevented by the use of a built-in pressure relief valve that includes a steel ball 328 that is acted on by a coil spring 330. The ball 328 rests against the outer end of a short passageway 332 which intersects the passageway 322. The spring is held in its passageway 334 by a suitable plug 336 that is threaded into the cylinder component. The 336 has a vent hole to permit the outward passage of grease when this valve opens. The pressure at which the valve releases is adjustable in a known manner by means of the plug 336.

For the discharge of grease from the space 120, there is provided a radially extending passageway 340 which intersects the wide section of the passageway 320. Another shorter passageway 342 intersects the passageway 340 at right angles and opens into a threaded seat 344 to which a hydraulic line can be connected. The outer end of the passageway 340 is blocked by a pipe plug 346. Thus, it will be understood that when the hydraulic nut is being expanded, the grease can be forced out of the space 120 and out through passageways 340 and 342 into a hydraulic line.

If desired, one can provide means for preventing relative rotation of certain major components with respect to their adjacent components. For example, one can provide a notch on the front face of the hydraulic piston component 56 and a cooperating keyway on the opposing face of the adjacent bearing member to prevent relative rotation. As such means for preventing relative rotation are well known, these optional features have not been illustrated in the drawings. Similarly, one could provide cooperating notches and keyways between the piston component 56 and the ring cylinder component 52 and between the cylinder component 52 and the end of the roll on which it is mounted.

It will be clear to those skilled in this art that various modifications and changes can be made to the illustrated versions of the invention without departing from the spirit and scope of this invention. For example, instead of using standard bolts to hold the split ring formed by the two halves 142 in place, one could use a large rubber O-ring that extends about the circumference of the two halves and rests in a suitable groove formed in the outer surface of the split ring. Also instead of two bolts on one side of the split ring, one could employ a suitable hinge that pivotally connects the two halves together. Also one could replace the split ring with the use of thread on the inside of the cylinder component 52 and on the reduced diameter shaft of the roll. In this embodiment the cylinder component would be threaded onto the roll end and thereby held securely in place. All such modifications and changes that fall within the scope of the appended claims are intended to be part of this invention.

We hereby claim:

1. In a rolling mill stand having a roll, a bearing member for rotatably mounting one end of said roll and a hydraulic fastener for holding said bearing member in place comprising a hydraulic ring cylinder component having one face extending generally perpendicular to the roll axis and an inner cylindrical surface adapted to fit onto a reduced diameter end section of said roll, a chamber extending about the circumference of and located in said cylinder component and open at said one face, a hydraulic ring piston component slidably received in said chamber and having an inner face, means for retaining at least a substantial portion of said piston component in said chamber, passageway means in said cylinder component for injecting a hydraulic material into said chamber and into a space formed between said inner face of said piston component and an opposing face of said chamber, further passageway means in said cylinder component for injecting a hydraulic material into said chamber and into another space, one side of which is at least part of an outer face of said piston component, injection of said hydraulic material through said further passageway acting to push said piston component further into said chamber, means for retaining the combination of said cylinder component and said piston component on said end section of said roll, and zero-leakage, two-directional seals arranged between said cylinder component and said piston component at both radially inner and radially outer sides of said piston wherein during normal use of said rolling mill, said hydraulic fastener is maintained under pressure to hold said bearing member in place.

2. A rolling mill stand according to claim 1 wherein each seal is capable of sealing off hydraulic material under pressure of at least 2000 psi.

3. A rolling mill stand according to claim 1 including a mechanical locking device capable of holding said one end of said roll in place in event of failure of the hydraulic cylinder and piston components, said locking device including a locking ring threadably mounted on the exterior of said ring cylinder.

4. A rolling mill stand according to claim 1 wherein said piston retaining means includes a retaining ring threaded into an opening in said one face of said cylinder component.

5. A rolling mill stand according to claim 1 wherein said piston retaining means includes a retaining ring threaded into an opening in said front face of said cylinder component and another zero-leakage seal is arranged between said retaining ring and one side of said piston.

6. A rolling mill stand according to claim 1 wherein said cylinder component retaining means includes a split ring detachably connectable to a neck of said roll and adapted to engage a rear face of said cylinder component.

7. A rolling mill stand according to claim 2 wherein the seals are filled Teflon seals.

8. A rolling mill stand according to claim 7 wherein each seal includes a suitable energizer supporting and in back of said filled Teflon seal.

9. A rolling mill stand according to claim 2 wherein each seal is capable of sealing off hydraulic material under pressure of at least 10,000 psi.

10. A rolling mill stand according to claim 8 wherein each seal is capable of sealing off hydraulic material under pressure of at least 10,000 psi.

11. A hydraulic fastener for mounting one end of a roll in a rolling mill stand comprising a hydraulic ring cylinder component having one face extending perpendicular to the roll axis and an inner cylindrical surface adapted to fit onto a reduced diameter end section of said roll, a chamber extending about the circumference of and located in said cylinder component and open at said one face, a hydraulic ring piston component slidably received in said chamber and having an inner face, means for retaining at least a substantial portion of said piston component in said chamber, passageway means in said cylinder component for injecting a hydraulic material into said chamber and into a space formed between said inner face of said piston component and an opposing face of said chamber, further passageway means in said cylinder component for injecting a hydraulic material into said chamber and into another space, one side of which is at least part of an outer face of said piston component, injection of said hydraulic material through said further passageway acting to push said piston component further into said chamber, means for retaining the combination of said cylinder component and said piston component on said end section of said roll, and zero-leakage, two-directional seals arranged between said cylinder component and said piston component at both radially inner and radially outer sides of said piston, wherein said cylinder component retaining means includes a split ring detachably connectable to a neck of said roll and adapted to engage a rear face of said cylinder component and wherein both said rear face of said cylinder component and an axially inner face of said split ring are provided with sloping surfaces located opposite one another in the axial direction of the roll, whereby extension of said piston component from said cylinder component causes interengagement of said sloping surfaces, thereby holding said split ring on said neck.

12. A hydraulic fastener for mounting one end of a roll in a rolling mill stand comprising a hydraulic ring cylinder component having a front face directed towards said roll and an inner cylindrical surface adapted to fit onto a reduced diameter end section of said roll, a chamber extending about the circumference of and located in said cylinder component and open at said front face, a hydraulic ring piston component slidably received in said chamber and having an inner face, means for retaining at least a substantial portion of said piston in said chamber, passageway means in said cylinder component for injecting a hydraulic material into said chamber and into a space formed between said inner face of said piston and an opposing face of said chamber, and seals arranged between said cylinder component and said piston at both radially inner and radially outer sides of said piston, wherein said ring piston has an axial extension projecting axially outwardly from said front face of said cylinder component, said extension having means for pulling an adjacent bearing member, provided to rotatably mount said roll, when said ring piston is retracted into said cylinder component.

13. A hydraulic fastener according to claim 12 wherein said means for pulling on said bearing member comprises a radially outwardly extending flange integrally formed on said extension.

14. A hydraulic fastener according to claim 12 wherein said ring piston is recessed on one side thereof to form a second space that is closed at one end by said retaining means and closed at the opposite end by a shoulder formed on said one side of said ring piston, said fastener including further passageway means in said cylinder component for injecting a hydraulic material into said second space in order to retract said ring piston.

15. A hydraulic fastener according to claim 12 including means for retaining said cylinder component on said end section of said roll.

16. A hydraulic fastener according to claim 12 wherein said seals are zero-leakage, two directional seals capable of sealing off hydraulic material under pressure of at least 2000 psi.

17. A hydraulic fastener according to claim 12 including a mechanical locking device capable of holding said one end of said roll in place in event of failure of the hydraulic cylinder component and the piston, said locking device including a locking ring threadably mounted on the exterior of said ring cylinder component.

18. A hydraulic fastener according to claim 12 wherein said piston retaining means includes a retaining ring threaded into an opening in said front face of said cylinder component.

19. A hydraulic fastener according to claim 12 wherein said seals are zero-leakage, two directional seals capable of sealing off hydraulic material under pressure of at least 2000 psi, said piston retaining means includes a retaining ring threaded into an opening in said front face of said cylinder component, and another zero-leakage, two-directional seal is arranged between said retaining ring and one side of said piston.

20. A hydraulic fastener according to claim 12 wherein said seals are zero-leakage seals capable of sealing off hydraulic material under pressure of at least 10,000 psi.

21. In a rolling mill stand having a roll, a bearing member for rotatably mounting one end of said roll and a hydraulic fastener for holding said bearing member in place comprising a hydraulic ring cylinder component having one face extending generally perpendicular to the roll axis and an inner cylindrical surface adapted to fit onto an end section of said roll, a chamber extending about the circumference of and located in said cylinder component and open at said one face, a hydraulic ring piston component slidably received in said chamber and having an inner face, passageway means in said cylinder component for injecting a hydraulic material into said chamber and into a space formed between said inner face of said piston and an opposing face of said chamber, means for retaining the combination of said cylinder component and said piston component on said end section of said roll, and zero-leakage two-directional seals arranged between said cylinder component and said piston at both radially inner and radially outer sides of said piston, each seal capable of withstanding pressure of at least 2000 psi wherein during normal use of said rolling mill, said hydraulic fastener is maintained under hydraulic pressure to hold said bearing member in place.

22. A rolling mill stand according to claim 21 including a retaining ring extending about the radially outer periphery of said cylinder component and adapted for connection to an adjacent roll chock and a rotating seal mounted between said cylinder component and said retaining ring.

23. A rolling mill stand according to claim 21 including a high pressure relief valve mounted in or on said cylinder component for venting hydraulic material from said passageway means when the hydraulic pressure in said space exceeds a desired upper limit.

24. A rolling mill stand according to claim 21 wherein each of said seals is a Teflon seal.

25. A rolling mill stand according to claim 24 including further passageway means in said cylinder component for injecting a hydraulic material into said chamber and into another space, one side of which is at least part of an outer face of said piston component, injection of said hydraulic material through said further passageway acting to push said piston component further into said chamber.

26. A hydraulic fastener for mounting a bearing member for one end of a roll in a rolling mill stand comprising a hydraulic ring cylinder component having one face extending perpendicular to the roll axis and an inner cylindrical surface adapted to fit onto an end section of said roll, a chamber extending about the circumference of and located in said cylinder component and open at said one face, a hydraulic ring piston component slidably received in said chamber and having an inner face, passageway means in said cylinder component for injecting a hydraulic material into said chamber and into a space formed between said inner face of said piston and an opposing face of said chamber, means for retaining said cylinder component on said end section of said roll, and zero-leakage seals arranged between said cylinder component and said piston at both radially inner and radially outer sides of said piston, each seal capable of withstanding pressure of at least 2000 psi, wherein said ring piston has an axial extension projecting axially outwardly from said one face of said cylinder component, said extension having means for pulling an adjacent bearing member, provided to rotatably mount said roll, when said ring piston is retracted into said cylinder component.

27. A hydraulic fastener according to claim 26 wherein said means for pulling on said bearing member comprises a radially outwardly extending flange integrally formed on said extension.

28. A hydraulic fastener according to claim 26 wherein said ring piston is recessed on one side thereof to form a second space that is closed at one end by said retaining means and closed at the opposite end by a shoulder formed on said one side of said ring piston, said fastener including further passageway means in said cylinder component for injecting a hydraulic material into said second space in order to retract said ring piston, wherein said seals are two-directional seals.

29. A hydraulic fastener according to claim 28 including a high pressure relief valve mounted in or on said cylinder component for venting hydraulic material from said further passageway means when the hydraulic pressure in said second space exceeds a desired upper limit.

30. A hydraulic fastener according to claim 28 wherein each seal is capable of sealing off hydraulic material under pressure of at least 10,000 psi.

* * * * *